(12) United States Patent
Xiong et al.

(10) Patent No.: US 11,170,528 B2
(45) Date of Patent: Nov. 9, 2021

(54) OBJECT POSE TRACKING METHOD AND APPARATUS

(71) Applicant: UBTECH ROBOTICS CORP LTD, Shenzhen (CN)

(72) Inventors: Youjun Xiong, Shenzhen (CN); Wanli Zhang, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 243 days.

(21) Appl. No.: 16/548,868

(22) Filed: Aug. 23, 2019

(65) Prior Publication Data

US 2020/0184682 A1 Jun. 11, 2020

(30) Foreign Application Priority Data

Dec. 11, 2018 (CN) .......................... 201811510743.8

(51) Int. Cl.
*G06T 7/73* (2017.01)
*G06T 7/90* (2017.01)
*G06T 7/246* (2017.01)

(52) U.S. Cl.
CPC ................ *G06T 7/75* (2017.01); *G06T 7/251* (2017.01); *G06T 7/90* (2017.01)

(58) Field of Classification Search
CPC .. G06T 7/75; G06T 7/90; G06T 7/251; G06T 2207/10024; G06T 7/246; G06T 7/70; G06T 2207/10012
See application file for complete search history.

(56) References Cited

U.S. PATENT DOCUMENTS

| 2014/0112529 | A1* | 4/2014 | Park ......................... G06T 7/33 |
| | | | 382/103 |
| 2014/0233800 | A1* | 8/2014 | Kis ......................... G06T 7/246 |
| | | | 382/103 |
| 2017/0018121 | A1* | 1/2017 | Lawson .................. G06T 17/00 |
| 2019/0325600 | A1* | 10/2019 | Balan ....................... G06T 7/70 |

FOREIGN PATENT DOCUMENTS

| CN | 109961523 A | * | 7/2019 | |
| CN | 111091597 A | * | 5/2020 | |
| EP | 2234064 B1 | * | 11/2011 | ............... G06T 7/75 |
| JP | 2016197287 A | * | 11/2016 | ............... G06T 7/75 |

(Continued)

*Primary Examiner* — Charles T Shedrick

(57) ABSTRACT

The present disclosure relates to robot technology, which provides an object pose tracking method and apparatus. The method includes: obtaining an initial pose of the object, and determining a first viewing angle of an object with respect to a camera based on the initial pose; searching for a first 3D model corresponding to the first viewing angle; calculating a projected contour of an initial pose using the searched first 3D model, and obtaining feature point(s) of the projected contour; calculating a pose change amount based on the feature point(s) of the projected contour and feature point(s) of a real contour; and performing an iterative calculation on the pose change amount to obtain a pose correction amount, and obtaining a corrected pose of the object based on the pose correction amount. In the calculation process, the 3D model can be selected to improve the calculation speed by fewer feature points.

20 Claims, 5 Drawing Sheets

(56) References Cited

FOREIGN PATENT DOCUMENTS

| KR | 20140110584 A | * | 9/2014 | ......... G06K 9/00671 |
| WO | WO-2011068412 A1 | * | 6/2011 | ............. G06T 7/246 |
| WO | WO-2014083721 A | * | 6/2014 | ............. G06T 7/246 |
| WO | WO-2016079960 A1 | * | 5/2016 | ............... G06T 7/20 |
| WO | WO-2017020766 A1 | * | 2/2017 | ............... G06K 9/00 |

* cited by examiner

OBJECT POSE TRACKING METHOD AND APPARATUS

CROSS REFERENCE TO RELATED APPLICATIONS

This application claims priority to Chinese Patent Application No. 201811510743.8, filed Dec. 11, 2018, which is hereby incorporated by reference herein as if set forth in its entirety.

BACKGROUND

1. Technical Field

The present disclosure relates to robot technology, and particularly to an object pose tracking method and apparatus.

2. Description of Related Art

For an object with higher complexity such as an object having multiple sub-parts, or an object having multiple parts can be moved around a main body by rotating or shifting such as an object having tracks or a shovel, it will be more difficult to perform pose tracking on the object.

When tracking an object by using features such as feature points or feature lines, it is possible to effectively track the pose of the object that is moved slowly or not in rotation. However, in the case that the speed of the object is increased, or there are many similar straight line features on the object, it is easy to cause the poor robustness of the tracking system and it is liable to lose the target to be tracked. In addition, if too many features are adopted, the calculation time will be greatly increased, which affects the execution time and the tracking cannot be performed in real time.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In order to explain the technical solutions described in the present disclosure, the following provides a description through specific embodiments.

Figure 1:
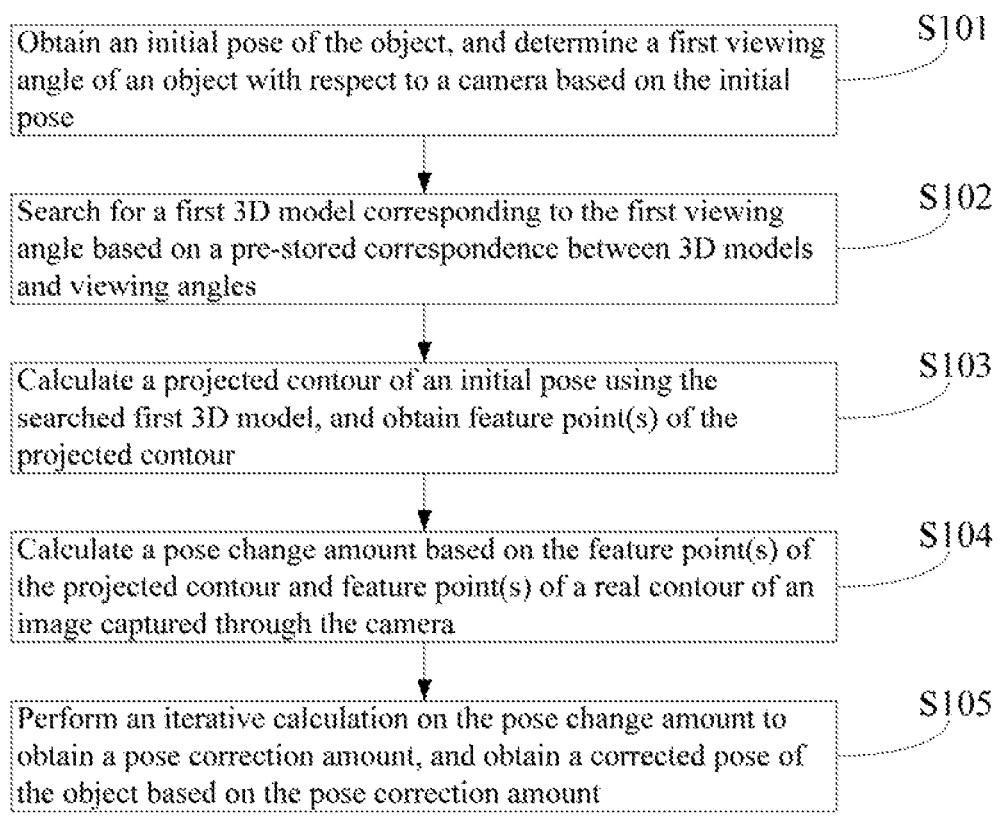
FIG. 1 is a flow chart of an object pose tracking method according to an embodiment of the present disclosure.

FIG. 1 is a flow chart of an object pose tracking method according to an embodiment of the present disclosure. In this embodiment, an object pose tracking method is provided. The method is a computer-implemented method executable for a processor, which may be implemented through and applied to an object pose tracking apparatus shown in FIG. 4 or an object pose tracking terminal device shown in FIG. 5, or implemented through a computer readable storage medium. As shown in FIG. 1, in this embodiment, the method includes the following steps.

S101: obtaining an initial pose of the object, and determining a first viewing angle of an object with respect to a camera based on the initial pose.

A pose of the object includes a position of the object and a posture of the object. In one embodiment, the initial pose of the object may be obtained based on an object pose initialization algorithm. For example, the object pose initialization algorithm can collect an image with the object through the camera, perform a feature extraction on the image with the object, and then perform a pose estimation based on extracted feature(s) so as to obtain the initial pose, while it is not limited thereto. The initial pose can be used to perform a tracking calculation on the pose of the object. Therefore, an independent initialization algorithm is required for providing a more accurate calculation basis to the subsequent tracking calculation.

In a real-time tracking process, the pose of the object can be obtained by calculating through the object pose tracking method of this embodiment, and the pose calculated in the N-th frame of images captured through the camera can be used as the initial pose for the pose tracking in the N+1-th frame, thereby obtaining the pose of the object more effectively through a series of pose tracking calculations. That is, after the corrected pose is obtained by calculating through the step S104 in FIG. 1, the corrected pose is taken as the initial pose for the calculation in the next frame, and the pose of the object in the next frame is further calculated, thereby effectively reducing the number of the initialization calculation for the initial pose and improves the execution efficiency.

In determining the first viewing angle of the object with respect to the camera based on the initial pose, as an example, the angle of the current object with respect to the camera in the camera yaw direction can be calculated according to a conversion relationship between the pose and the Euler angle first, and then the first viewing angle of the object with respect to the camera can be determined based on the angle of the yaw direction.

S102: searching for a first 3D (three dimension) model corresponding to the first viewing angle based on a pre-stored correspondence between 3D models and viewing angles.

A corresponding number of 3D models can be selected according to the characteristics of a contour of the object. For the angles with more repeatability in the contour, it can be divided into more 3D models, and each 3D model corresponds to a range of viewing angles. The correspondence may include, for example, ranges of viewing angles each corresponds to a 3D model. When calculating the pose of the object, the viewing angle (i.e., the first viewing angle) corresponding to the initial pose can be determined based on the initial pose, and the corresponding 3D model (i.e., the first 3D model) can be quickly selected or searched out based on the range of viewing angle to which the viewing angle belongs. By calculating a change amount of the pose based on the selected/searched 3D model, it can be more clear in its objective and is beneficial to reduce the computational complexity while improving the accuracy of calculation.

S103: calculating a projected contour of an initial pose using the searched first 3D model, and obtaining feature point(s) of the projected contour.

In this embodiment, after the model is selected/searched, the object is projected from a world coordinate system to a camera coordinate system based on the selected/searched first 3D model and the initial pose to obtain an image of the camera coordinate system, and the image of the camera coordinate system is converted into an image of an image coordinate system by projecting the image of the camera coordinate system to the image coordinate system based on internal parameter(s) of the camera to obtain the image of the image coordinate system which is a hypothetical image, and then a contour calculation is performed based on the image of the image coordinate system to obtain the projected contour and can determine the feature point(s) included in the projected contour.

S104: calculating a pose change amount based on the feature point(s) of the projected contour and feature point(s) of a real contour of an image captured through the camera.

Figure 2:
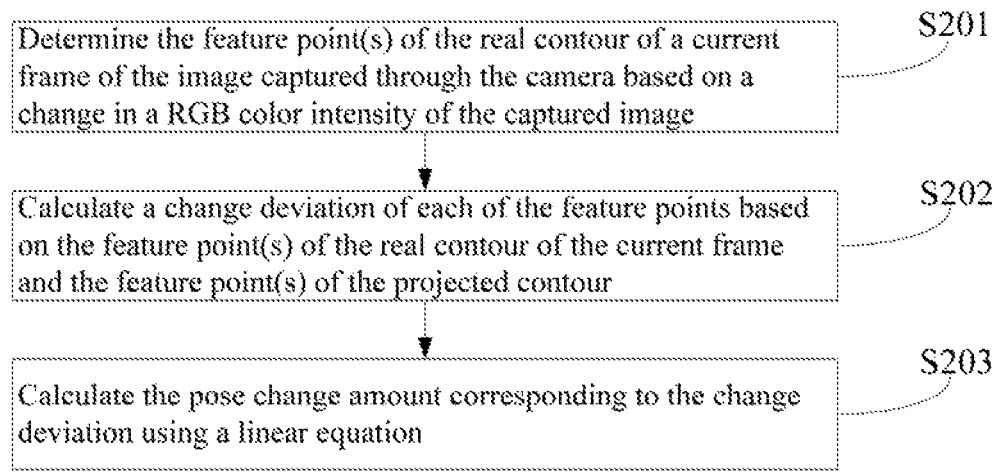
FIG. 2 is a flow chart of an example of calculating a pose change amount in the method of FIG. 1.

After determining the feature point(s) of the projected contour, in order to determine the pose change amount, the contour of the captured image is further extracted. After the extracted contour of the contour of the captured image is obtained, a feature point calculation is performed on the extracted contour of the contour of the captured image to obtain the feature point(s) of the real contour of the captured image. Based on the feature point(s) of the real contour of the captured image and the feature point(s) of the projected contour, a change deviation of each feature point can be calculated, and the pose change amount of the initial pose with respect to a real pose can be calculated based on the change deviation of the feature point. FIG. 2 is a flow chart of an example of calculating a pose change amount in the method of FIG. 1. As shown in FIG. 2, in this embodiment, step S104 of the method of FIG. 1 includes the following steps.

S201: determining the feature point(s) of the real contour of a current frame of the image captured through the camera based on a change in a RGB color intensity of the captured image.

The feature point(s) of the real contour of the captured image are searched based on the change in the RGB color intensity of the captured image so as to determine the feature point(s) of the real contour of the captured image.

S202: calculating a change deviation of each of the feature points based on the feature point(s) of the real contour of the current frame and the feature point(s) of the projected contour.

Since the positions of the feature points of the contours corresponding to different poses are different, the change of the positions of the feature points can be determined through the feature point(s) of the real contour of the current frame and the feature point(s) of the projected contour, and the change deviation can be determined based on the changed positions.

S203: calculating the pose change amount corresponding to the change deviation using a linear equation.

Based on the calculated change deviation, the pose change amount (i.e., the manner in which the pose changes) can be obtained in a linear direction, and then the contour of the current frame can be obtained through the initial pose.

S105: performing an iterative calculation on the pose change amount to obtain a pose correction amount, and obtaining a corrected pose of the object based on the pose correction amount.

The LM (Levenberg-Marquardt) algorithm can be used to perform the iterative calculation on the pose change amount, that is, the pose change amount corresponding to the iterative convergence is obtained by using the iterative algorithm to perform the iterative calculation repeatedly, and the initial pose of the object is corrected based on the pose correction amount to obtain the corrected pose of the object.

Figure 3:
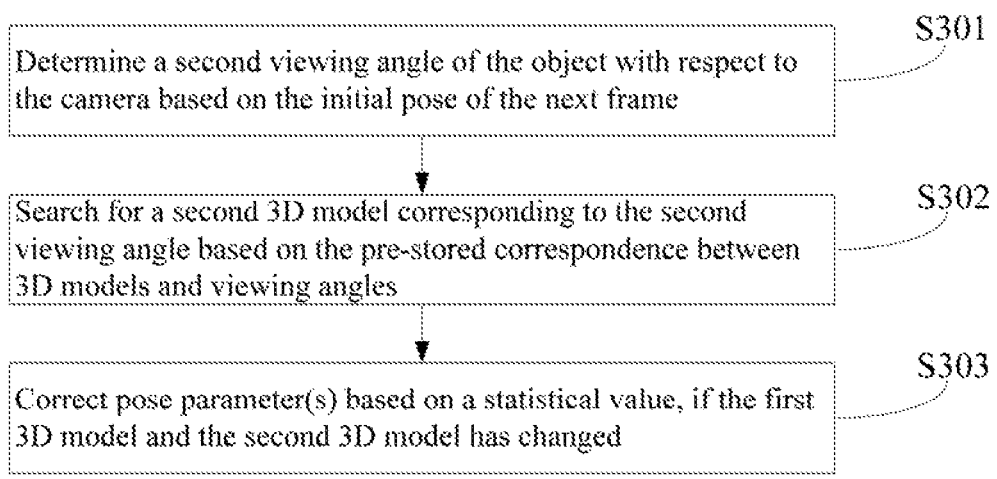
FIG. 3 is a flow chart of an example of calculating a pose corresponding to a next frame in the method of FIG. 1.

Furthermore, in one embodiment, after the corrected pose of the object is obtained based on the pose correction amount, it can be used as the initial pose of the next frame to calculating the pose of the object corresponding to the next frame. FIG. 3 is a flow chart of an example of calculating a pose corresponding to a next frame in the method of FIG. 1. As shown in FIG. 3, in this embodiment, the method includes the following steps.

S301: determining a second viewing angle of the object with respect to the camera based on the initial pose of the next frame.

Based on a conversion relationship between the pose and the Euler angle, the initial pose of the next frame can be determined.

S302: searching for a second 3D model corresponding to the second viewing angle based on the pre-stored correspondence between 3D models and viewing angles.

Based on the pre-stored correspondence between 3D models and viewing angles, the range of viewing angle to which the second viewing angle belongs is searched so as to determine the second 3D model corresponding to the second viewing angle.

S303: correcting pose parameter(s) based on a statistical value, if the first 3D model and the second 3D model has changed.

If the first 3D model is different from the second 3D model, a model switching is required. Since the origins of the world coordinate systems selected by the different models may have deviations, it needs to correct the 6D parameters of the pose. The correction can be obtained based on statistical data of experiments.

Through the object pose tracking method of this embodiment, object tracking can be realized in different viewing angle regions, and the robustness at the time of switching can be extremely strong. Even if the estimation of the pose before switching is slightly deviated, it can continuously correct the pose through its own iterative searches to find the correct pose after switching. It can be known according to the experimental results that, under the premise that the size of the established model is accurate, in comparison with the actual relative pose, the current algorithm can accurately provide the 6-degree-of-freedom pose of the object (which includes 3 dimensions of position vectors and 3 dimensions of posture Rogge vectors).

In addition, in this embodiment, when determining the feature points of the contour of the current frame, it can make the color of the object within the contour that corresponds to the model to have a certain discrimination from the outside, thereby making the robustness of the pose better.

Therefore, the object pose tracking method of this embodiment can provide better tracking accuracy. In comparison with the tracking method based on features such as straight lines, it makes the robustness of the whole tracking system stronger in the case with more background interferences and larger changes in the pose of the object. In comparison with the pose tracking method with more feature points, the calculation of the object pose tracking method of this embodiment is simpler and has better execution efficiency.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 4:
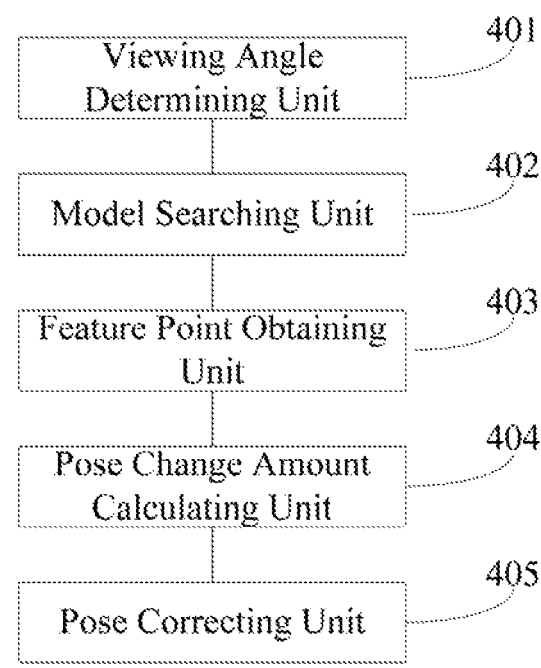
FIG. 4 is a schematic block diagram of an object pose tracking apparatus according to an embodiment of the present disclosure.

FIG. 4 is a schematic block diagram of an object pose tracking apparatus according to an embodiment of the present disclosure. In this embodiment, an object pose tracking apparatus is provided. As shown in FIG. 4, the object pose tracking apparatus includes:

a viewing angle determining unit 401 configured to obtain an initial pose of the object, and determine a first viewing angle of an object with respect to a camera based on the initial pose;

a model searching unit 402 configured to search for a first 3D model corresponding to the first viewing angle based on a pre-stored correspondence between 3D models and viewing angles;

a feature point obtaining unit 403 configured to calculate a projected contour of an initial pose using the searched first 3D model, and obtain feature point(s) of the projected contour;

a pose change amount calculating unit 404 configured to calculate a pose change amount based on the feature point(s) of the projected contour and feature point(s) of a real contour of an image captured through the camera; and a pose correcting unit 405 configured to perform an iterative calculation on the pose change amount to obtain a pose correction amount, and obtain a corrected pose of the object based on the pose correction amount.

In one embodiment, the apparatus further includes:

a next frame calculating unit configured to calculate a pose of the object corresponding to a next frame by taking the corrected pose of the object as the initial pose of the next frame.

The object pose tracking apparatus of FIG. 4 corresponds to the object pose tracking method of FIG. 1. In this embodiment, each of the above-mentioned units is implemented in the form of software, which can be computer program(s) stored in a memory of the object pose tracking apparatus and executable on a processor of the object pose tracking apparatus. In other embodiments, each of the above-mentioned units may be implemented in the form of hardware (e.g., a circuit of the object pose tracking apparatus which is coupled to the processor of the object pose tracking apparatus) or a combination of hardware and software (e.g., a circuit with a single chip microcomputer).

Figure 5:
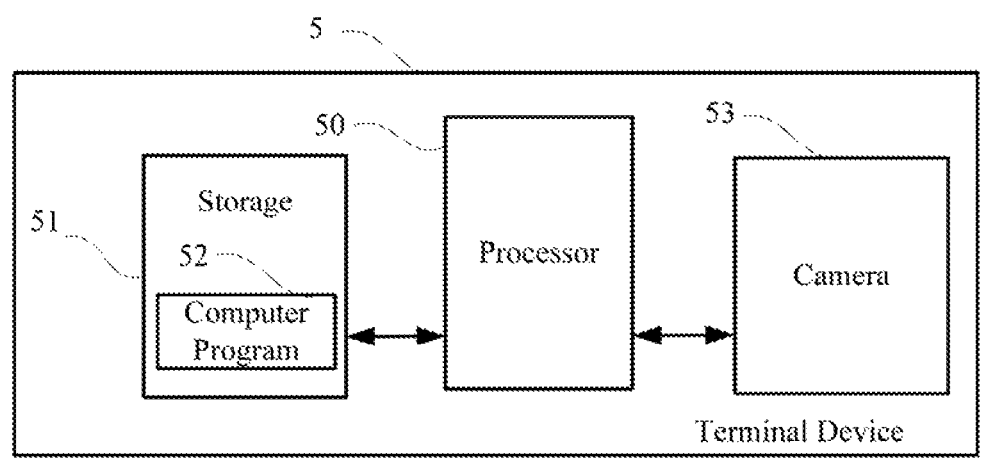
FIG. 5 is a schematic block diagram of an object pose tracking terminal device according to an embodiment of the present disclosure.

FIG. 5 is a schematic block diagram of an object pose tracking terminal device according to an embodiment of the present disclosure. In this embodiment, an object pose tracking terminal device is provided, and the object pose tracking terminal device may be, for example, the object pose tracking apparatus of FIG. 4. As shown in FIG. 5, in this embodiment, the object pose tracking terminal device 5 includes a processor 50, a storage 51, a computer program 52 stored in the storage 51 and executable on the processor 50, for example, an object pose tracking program, and a camera 53. When executing (instructions in) the computer program 52, the processor 50 implements the steps in the above-mentioned embodiments of the object pose tracking method. Alternatively, when the processor 50 executes the (instructions in) computer program 52, the functions of each module/unit in the above-mentioned apparatus embodiment.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the object pose tracking terminal device 5. For example, computer program 52 can be divided into:

a viewing angle determining unit configured to obtain an initial pose of the object, and determine a first viewing angle of an object with respect to a camera based on the initial pose;

a model searching unit configured to search for a first 3D model corresponding to the first viewing angle based on a pre-stored correspondence between 3D models and viewing angles;

a feature point obtaining unit configured to calculate a projected contour of an initial pose using the searched first 3D model, and obtain feature point(s) of the projected contour;

a pose change amount calculating unit configured to calculate a pose change amount based on the feature point(s) of the projected contour and feature point(s) of a real contour of an image captured through the camera; and a pose correcting unit configured to perform an iterative calculation on the pose change amount to obtain a pose correction amount, and obtain a corrected pose of the object based on the pose correction amount.

The object pose tracking terminal device 5 may include, but is not limited to, a processor 50 and a storage 51. It can be understood by those skilled in the art that FIG. 5 is merely an example of the object pose tracking terminal device 5 and does not constitute a limitation on the object pose tracking terminal device 5, and may include more or fewer components than those shown in the figure, or a combination of some components or different components. For example, the object pose tracking terminal device 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the object pose tracking terminal device 5, for example, a hard disk or a memory of the object pose tracking terminal device 5. The storage 51 may also be an external storage device of the object pose tracking terminal device 5, for example, a plug-in hard disk, a smart media card (SMC), a secure digital (SD) card, flash card, and the like, which is equipped on the object pose tracking terminal device 5. Furthermore, the storage 51 may further include both an internal storage unit and an external storage device, of the object pose tracking terminal device 5. The storage 51 is configured to store the computer program 52 and other programs and data required by the object pose tracking terminal device 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented object pose tracking method, comprising executing on a processor steps of:
    obtaining an initial pose of the object, and determining a first viewing angle of an object with respect to a camera based on the initial pose, wherein the first viewing angle is determined based on a first angle of the object with respect to the camera in a camera yaw direction, and the first angle is calculated according to a conversion relationship between the initial pose and an Euler angle;
    searching for a first 3D model corresponding to the first viewing angle based on a pre-stored correspondence between 3D models and viewing angles;
    calculating a projected contour of an initial pose using the searched first 3D model, and obtaining one or more feature points of the projected contour;
    calculating a pose change amount based on the one or more feature points of the projected contour and one or more feature points of a real contour of an image captured through the camera; and performing an iterative calculation on the pose change amount to obtain a pose correction amount, and obtaining a corrected pose of the object based on the pose correction amount.

2. The method of claim 1, wherein after the step of obtaining the corrected pose of the object based on the pose correction amount further comprises:
   calculating a pose of the object corresponding to a next frame by taking the corrected pose of the object as the initial pose of the next frame.

3. The method of claim 2, wherein the step of calculating the pose of the object corresponding to the next frame by taking the corrected pose of the object as the initial pose of the next frame comprises:
   determining a second viewing angle of the object with respect to the camera based on the initial pose of the next frame;
   searching for a second 3D model corresponding to the second viewing angle based on the pre-stored correspondence between 3D models and viewing angles; and
   correcting one or more pose parameters based on a statistical value, in response to the first 3D model and the second 3D model having changed.

4. The method of claim 1, wherein the step of calculating the projected contour of the initial pose using the searched first 3D model comprises:
   projecting the object from a world coordinate system to a camera coordinate system based on the searched first 3D model and the initial pose to obtain an image of the camera coordinate system; and
   converting the image of the camera coordinate system into an image of an image coordinate system based on one or more internal parameters of the camera, and calculating the projected contour based on the image of the image coordinate system.

5. The method of claim 1, wherein the step of calculating the pose change amount based on the one or more feature points of the projected contour and the one or more feature points of the real contour of the image captured through the camera comprises:
   determining the one or more feature points of the real contour of a current frame of the image captured through the camera based on a change in a RGB color intensity of the captured image;
   calculating a change deviation of each of the feature points based on the one or more feature points of the real contour of the current frame and the one or more feature points of the projected contour; and
   calculating the pose change amount corresponding to the change deviation using a linear equation.

6. The method of claim 1, wherein the step of obtaining the initial pose of the object comprises:
   collecting, through the camera, an image with the object;
   performing a feature extraction on the image with the object to obtain one or more features; and
   performing a pose estimation based on the one or more feature(s) to obtain the initial pose.

7. The method of claim 3, wherein the pre-stored correspondence comprises ranges of viewing angles each corresponds to a 3D model.

8. An object pose tracking apparatus, comprising:
   a camera;
   a memory;
   a processor; and
   one or more computer programs stored in the memory and executable on the processor, wherein the one or more computer programs comprise:
   a viewing angle determining unit configured to obtain an initial pose of the object, and determine a first viewing angle of an object with respect to a camera based on the initial pose, wherein the first viewing angle is determined based on a first angle of the object with respect to the camera in a camera yaw direction, and the first angle is calculated according to a conversion relationship between the initial pose and an Euler angle;
   a model searching unit configured to search for a first 3D model corresponding to the first viewing angle based on a pre-stored correspondence between 3D models and viewing angles;
   a feature point obtaining unit configured to calculate a projected contour of an initial pose using the searched first 3D model, and obtain one or more feature points of the projected contour;
   a pose change amount calculating unit configured to calculate a pose change amount based on the one or more feature points of the projected contour and one or more feature points of a real contour of an image captured through the camera; and
   a pose correcting unit configured to perform an iterative calculation on the pose change amount to obtain a pose correction amount, and obtain a corrected pose of the object based on the pose correction amount.

9. The apparatus of claim 8, wherein the one or more computer programs further comprise:
   a next frame calculating unit configured to calculate a pose of the object corresponding to a next frame by taking the corrected pose of the object as the initial pose of the next frame.

10. The apparatus of claim 9, wherein the next frame calculating unit is configured to:
    determine a second viewing angle of the object with respect to the camera based on the initial pose of the next frame;
    search for a second 3D model corresponding to the second viewing angle based on the pre-stored correspondence between 3D models and viewing angles; and
    correct one or more pose parameters based on a statistical value, in response to the first 3D model and the second 3D model having changed.

11. The apparatus of claim 8, wherein the feature point obtaining unit is configured to:
    project the object from a world coordinate system to a camera coordinate system based on the searched first 3D model and the initial pose to obtain an image of the camera coordinate system; and
    convert the image of the camera coordinate system into an image of an image coordinate system based on one or more internal parameters of the camera, and calculate the projected contour based on the image of the image coordinate system.

12. The apparatus of claim 8, wherein the pose change amount calculating unit is configured to:
    determine the one or more feature points of the real contour of a current frame of the image captured through the camera based on a change in a RGB color intensity of the captured image;
    calculate a change deviation of each of the feature points based on the one or more feature points of the real contour of the current frame and the one or more feature points of the projected contour; and
    calculate the pose change amount corresponding to the change deviation using a linear equation.

13. The apparatus of claim 8, wherein the viewing angle determining unit is configured to:

collect, through the camera, an image with the object;

perform a feature extraction on the image with the object to obtain one or more features; and perform a pose estimation based on the one or more feature(s) to obtain the initial pose.

14. The apparatus of claim 10, wherein the pre-stored correspondence comprises ranges of viewing angles each corresponds to a 3D model.

15. The method of claim 7, wherein the method further comprises:

selecting a corresponding number of 3D models according to characteristics of a contour of the object, wherein for angles with more repeatability in the contour of the object, the contour of the object is divided into more 3D models; and wherein the step of searching for the first 3D model corresponding to the first viewing angle based on the pre-stored correspondence between the 3D models and the viewing angles comprises:

determining a first range of viewing angle to which the first viewing angle belongs; and searching for the first 3D model corresponding to the first range of viewing angle based on the pre-stored correspondence.

16. The method of claim 15, wherein the second viewing angle is determined based on a second angle of the object with respect to the camera in the camera yaw direction, and the second angle is calculated according to a conversion relationship between the initial pose of the next frame and the Euler angle.

17. The method of claim 16, wherein the step of searching for the second 3D model corresponding to the second viewing angle based on the pre-stored correspondence between the 3D models and the viewing angles comprises:

determining a second range of viewing angle to which the second viewing angle belongs; and searching for the second 3D model corresponding to the second range of viewing angle based on the pre-stored correspondence.

18. The apparatus of claim 14, wherein the one or more computer programs are further comprise:

a unit configured to select a corresponding number of 3D models according to characteristics of a contour of the object, wherein for angles with more repeatability in the contour of the object, the contour of the object is divided into more 3D models; and wherein the model searching unit is further configured to determine a first range of viewing angle to which the first viewing angle belongs, and search for the first 3D model corresponding to the first range of viewing angle based on the pre-stored correspondence.

19. The apparatus of claim 18, wherein the second viewing angle is determined based on a second angle of the object with respect to the camera in the camera yaw direction, and the second angle is calculated according to a conversion relationship between the initial pose of the next frame and the Euler angle.

20. The apparatus of claim 19, wherein the next frame calculating unit is further configured to:

determine a second range of viewing angle to which the second viewing angle belongs, and search for the second 3D model corresponding to the second range of viewing angle based on the pre-stored correspondence.

\* \* \* \* \*